Figure 1:
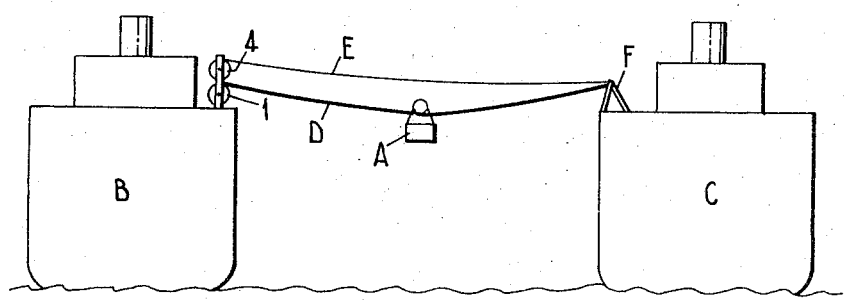

United States Patent Office 3,312,452
Patented Apr. 4, 1967

3,312,452
WINCH ARRANGEMENTS
Alan Henry Butler, Orpington, and Norman Reginald Barber, Dartford, England, assignors to The General Electric Company Limited, London, England
Filed May 10, 1965, Ser. No. 455,055
Claims priority, application Great Britain, May 8, 1964, 19,271/64
2 Claims. (Cl. 254—172)

This invention relates to winch arrangements of the kind having a cable or like flexible member carried on a winch drum and adapted to be connected to a load member so as to provide a line for transferring articles between two stations supporting the winch and load-member respectively, and which are capable of moving relatively to each other during such transfer to vary their distance apart. Such winch arrangements have application, for example, in the trans-shipment of cargo or stores between two ships at sea.

It is usual in these winch arrangements to provide control means which maintain the tension in the cable or like flexible member (hereinafter referred to as the support cable) substantially constant. This has the disadvantage that articles being transferred can vary their vertical height quite suddenly in dependence upon any variation of distance between the stations.

One object of this invention is to provide an improved system and winch arrangement which overcome this disadvantage.

According to the present invention a winch arrangement of the kind referred to above includes a further cable or like flexible member (hereinafter referred to as the measuring cable), which is carried by a cable drum coupled to the support cable drum, and is arranged to be connected to a load member on the opposite station such that a variation in the distance between the stations gives rise to an extension or reduction in the effective length of the measuring cable and a corresponding rotation of the measuring cable drum, the coupling between the measuring cable drum and the support cable drum being such that the latter is rotated to pay-out or haul in the support cable to compensate at least partly for variations in the distance between the stations.

It will be understood that the effective length of the measuring cable means the length of the cable between the cable drum and the load member on the opposite station to which it is connected.

The coupling between the measuring cable drum and the support cable drum may be of any suitable form, which produces the required compensating movement of the support cable drum, for example a mechanical, hydraulic or electrical form of coupling or any combination thereof may be employed.

In one application of the invention, the tension in the measuring cable may be initially adjusted to a maximum value such that when articles to be transferred between the stations are attached to the support cable the tension is shared between the measuring cable and the support cable, and when the tension in the support cable is at its maximum, some tension is still retained in the measuring cable.

In this arrangement the measuring cable drum and the support cable drum may be connected directly to each other, for example by being formed integrally with one another, or may be coupled to each other through appropriate gearing.

The total tension in the two cables may be maintained constant, or it may be arranged to vary in dependence upon the position of articles being transferred between the two stations in a manner such as to maintain the height of the articles substantially constant during such transfer.

In an alternative arrangement in which the measuring cable is carried by its own drum, the measuring cable may have a constant tension applied to it through the drum and this drum may be geared to the winch drum through a differential gear, the differential gear also being connected to a flow control valve of a hydraulic fluid circuit providing the drive for the winch arrangement.

The hydraulic fluid circuit may include one or more drive assemblies as described in co-pending application Ser. No. 455,054 filed May 10, 1965 by Alan Henry Butler for Variable Speed Drives and assigned to the owner of the present application. In this case the circuit is preferably provided with a further pair of valves which connect the pump to the low pressure or high pressure side of the circuit respectively in dependence upon the setting of the flow control valve.

In order that the invention may be readily understood, one winch arrangement in accordance with the invention will now be described, by way of example, with reference to FIGURES 1 and 2 of the accompanying drawings, which represent schematic diagrams of the arrangement. Referring to FIGURE 1, the arrangement is designed for transferring articles as at A between two stations represented by ships B, C which are capable of relative movement during said transfer to vary their distance apart, the articles being supported during said transfer by a support cable D carried by a rotatable winch drum 1. It will be seen that in the absence of any compensating means the height of the articles for any position between the stations could vary considerably if the distance between the stations varies.

Figure 2:
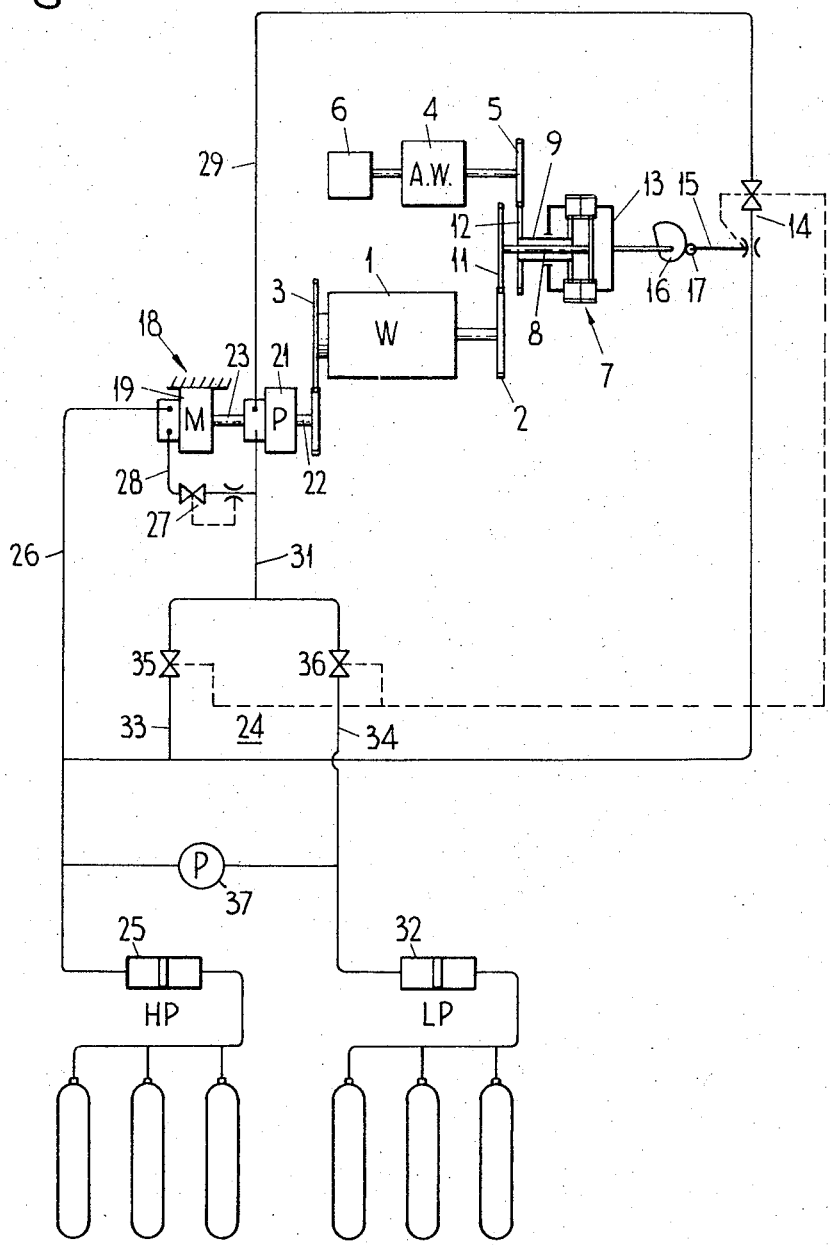

Referring now to FIGURE 2, the winch drum 1 for the support cable rigidly carries spur gears 2 and 3 at each of its ends, and the arrangement incorporates a further auxiliary winch drum 4 on which is wound a measuring cable, shown at E in FIGURE 1, the drum 5 rigidly carrying a spur gear 5 at one of its ends, the other end of the drum 4 being connected to the drive shaft of a constant torque motor 6. The spur gears 2 and 5 are connected through a differential gear 7 which comprises a pair of input shafts 8 and 9 connected to the spur gears 2 and 5 respectively through further spur gears 11 and 12, and a rotatable casing 13, which is connected to a flow control valve 14 via an adjustable link 15. The link 15 may be provided with any suitable means for adjusting its length and in the drawing this means is shown as a cam 16 and follower 17, the cam being pivoted in dependence upon rotation of the differential casing 13 to adjust the length of said link. The spur gear 3 is connected to a drive assembly 18 which comprises a hydraulic motor 19 and a hydraulic pump 21, the input shaft 22 of the pump being geared to the spur gear 3 and the casing of the pump being coupled to the output shaft 23 of the motor 19, the motor casing being fixed. The drive assembly 18, which is described in more detail in said co-pending patent application No. 455,054, is included in a hydraulic fluid circuit generally denoted 24. The circuit 24 includes a high pressure accumulator 25 which feeds the motor 19 via a supply line 26 so that the motor provides a constant torque at constant speed, and hence a constant power to the pump casing, a flow control valve 27 being included in the line 28 leading from the motor 19 to the pump 21. A further line 29 leads from the pump 21 back to the high pressure supply line 26 and carries the control valve 14 referred to hereinbefore. The line 28 has a by-pass line 31 connected between the control valve 27 and the pump 21 and this line is connected to the supply line 26 or a low pressure accumulator 32 via lines 33 and 34 respectively which are provided with shut-off valves 35 and 36 arranged to be operated in dependence upon the flow through the valve 14 in a manner hereinafter described. A pump 37 connected between the accumulators 25, 32 is operable to make up for any efficiency losses in the high pressure side of the circuit.

In use of the winch the drums 1 and 4 are located at one station, represented by the ship B in FIGURE 1, and the measuring cable E and support cable D are arranged to be connected to a support member F on another station, represented by the ship C, which is spaced from the first station as shown.

In operation of the winch any variation in distance between the two stations causes the drum 4 to rotate in one or other direction and thus the input to the differential via the spur gears 5 and 12 varies. This variation of the input causes the casing 13 of the differential to rotate in one or other direction which in turn adjusts the setting of the flow control valve 14 via the cam 16 and follower 17.

If the stations move to decrease their distance, the motor 6 will act on the drum 4 to haul in the measuring cable. This will have the effect of rotating the casing 13 in such a direction as to cause the flow control valve 14 to shut. The shutting of valve 14 will create a high back pressure to the pump 21 and thus the flow through the pump will fall. This means that the fluid in the line 28 emerging from the motor 19 will have to be dispersed and this is achieved by the opening of the valve 36 to the low pressure accumulator 32.

The effect of the operation of the circuit on the drive assembly is that, the relative movement between the casing of the pump 21 and its shaft 22 is decreased and the winch drum is caused to rotate by the motor 19 via the pump 21 and its shaft 22 to haul in the support cable. As soon as the winch drum 1 starts rotating the input to the differential 7 is modified by the additional input from the spur gears 2 and 11 which causes the valve 14 to cease its shutting movement and further rotation of the winch drum 1 causes the valve 14 to open until such time as the distance between the stations becomes steady and the valve 14 is restored to its initial condition.

If on the other hand the stations move to increase their distance apart, such movement will overcome the constant torque applied to the drum 4 by the motor 6 and will cause the drum to pay out measuring cable. The casing 13 of the differential will then rotate in its other direction to open the flow control valve 14 to permit the flow through the pump 21 to increase. This would mean that the pump 21 would require more oil to pump than that emerging from the motor 19, and hence the valve 36 would open to provide the excess oil from the high pressure side of the hydraulic circuit 24. In this case the effect of the operation of the circuit on the drive assembly 18 is that the relative movement between the casing of the pump 21 and its shaft 22 is increased, and this relative movement is further increased by the action of the spur gear 2 on the pump shaft 22 due to the winch drum 1 rotating to pay-out cable. Again the input to the differential 7 will be modified until the distance between the stations steadies and the valve 14 restores its initial condition.

It will be appreciated that the valves 35 and 36 can be linked to the valve 14 by any suitable means so as to be opened or closed as appropriate in dependence upon the flow through the valve 14.

We claim:
1. A winch arrangement comprising a winch drum, a support cable wound on said winch drum and connectable to a support member so as to provide a line for transferring articles between two stations carrying the winch drum and support member respectively, and which stations are capable of relative movement during such transfer to vary their distance apart, a cable drum, a differential gear connecting the winch drum and cable drum, a measuring cable wound on said cable drum and connectable to the support member, a constant torque motor coupled to the cable drum and operable to maintain a constant tension in the measuring cable where it is connected to the support member such that the measuring cable will extend directly between the two stations whereby any variation in the distance between the two stations causes a corresponding variation in the effective length of the measuring cable and thus a corresponding rotation of the cable drum, fluid drive means for rotating the winch drum to haul in the support cable as required, a fluid circuit for the fluid drive means, a flow control valve included in the fluid circuit, and a mechanical linkage connecting the differential gear to the flow control valve such that the opening of the valve is controlled in dependence upon the operation of the differential gear to modify the fluid circuit to pay-out or haul in the support cable as required whereby to maintain any articles carried by the support cable at a substantially constant height during their transfer between the two stations.

2. A winch arrangement comprising a winch drum operable by a fluid circuit, a support cable wound on said winch drum and connectable to a support member so as to provide a line for transferring articles between the stations carrying the winch drum and support member respectively, and which stations are capable of relative movement during such transfer to vary their distance apart, a cable drum associated with the winch drum, a measuring cable wound on said cable drum and connectable to the support member, a constant torque motor coupled to the cable drum for maintaining a tension in the measuring cable when it is connected to the support member such that the measuring cable extends directly between the two stations whereby any variation in the distance between the stations causes a corresponding variation in the effective length of the measuring cable, a main flow control valve controlling the fluid circuit of the winch drum, a differential gear mechanically linked to the main flow control valve and to the cable drum such that the winch drum is caused to pay out or haul in the support cable in dependence upon any variation in the effective length of the measuring cable to compensate at least partly for any variation in the distance between the two stations, whereby the articles may be maintained at a substantially constant height during their transfer between the two stations.

References Cited by the Examiner
UNITED STATES PATENTS 2,249,947 7/1941 Doe _____ 254—172
2,402,789 6/1946 Tweedale _____ 254—172

EVON C. BLUNK, Primary Examiner.

H. C. HORNSBY, Assistant Examiner.